United States Patent [19]
Schadt et al.

[11] Patent Number: 6,144,428
[45] Date of Patent: *Nov. 7, 2000

[54] OPTICAL COMPONENT

[75] Inventors: Martin Schadt, Seltisberg, Switzerland; Andreas Schuster, Freiburg; Hubert Seiberle, Rümmingen, both of Germany

[73] Assignee: Rolic AG, Basel, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/721,510

[22] Filed: Sep. 26, 1996

Related U.S. Application Data

[63] Continuation of application No. 08/489,866, Jun. 13, 1995, abandoned.

[30] Foreign Application Priority Data

Jun. 24, 1994 [CH] Switzerland ............................. 2017/94

[51] Int. Cl.⁷ ................................................. G02F 1/1335
[52] U.S. Cl. ............................................................ 349/113
[58] Field of Search ..................................... 349/113, 123

[56] References Cited

U.S. PATENT DOCUMENTS

| | | |
|---|---|---|
| 4,472,627 | 9/1984 | Weinberger . |
| 4,536,014 | 8/1985 | Boutaleb et al. . |
| 4,974,941 | 12/1990 | Gibbons et al. . |
| 5,141,785 | 8/1992 | Yoshinada et al. . |
| 5,210,630 | 5/1993 | Heynderrickx et al. . |
| 5,220,444 | 6/1993 | Mitsui et al. ............................. 349/113 |
| 5,331,448 | 7/1994 | Kajiyama et al. . |
| 5,550,658 | 8/1996 | Yoshihiro ................................ 349/113 |

FOREIGN PATENT DOCUMENTS

| | | |
|---|---|---|
| 331 233 | 2/1989 | European Pat. Off. . |
| 435 029 | 7/1991 | European Pat. Off. . |
| 611 981 | 2/1994 | European Pat. Off. . |
| 94/02329 | 2/1994 | WIPO . |

OTHER PUBLICATIONS

Derwent Abstract No. AN–91–231516/32
Derwent Abstract No. AN–94–265517/33
Research Disclosure No. 337, Emsworth, GB, pp. 410–411 (May 1992).
Patent Abstracts of Japan, vol. 15(318) (M–1146) (JP 3–118199) (Aug. 1991).

*Primary Examiner*—James A. Dudek
*Attorney, Agent, or Firm*—Finnegan, Henderson, Farabow, Garrett & Dunner, L.L.P.

[57] ABSTRACT

By combination of a hybrid layer formed from an orienting layer and a layer of a cross-linked liquid crystalline monomer with a reflector, and by appropriate local structuring of the molecule orientation, an optical pattern is obtained which cannot be copied using conventional photocopiers. This pattern is useful as means for protecting documents, such as banknotes, credit cards, and the like, from being copied, and can be detected by manually or automatically, operated optical reading devices.

11 Claims, 1 Drawing Sheet

OPTICAL COMPONENT

This application is a continuation of Ser. No. 08/489,866, filed Jun. 13, 1995, abandoned.

BACKGROUND OF THE INVENTION

1. Field

The invention relates to an optical component comprising a layer structure made up of an anisotropic layer of cross-linked liquid crystalline monomers in contact with an orientation layer on a substrate. The invention also relates to the production and preferred use of the aforementioned components.

2. Description

Anisotropic transparent or colored polymer network layers with the optical axis oriented in three dimensions, either uniformly or pre-set point by point, are of great importance in many branches of display technology, integrated optics, etc.

Substances having these properties in principle, that is certain cross-linkable liquid crystalline diacrylates and diepoxides, have been known for some years. These substances in monomer form (before cross-linking) can be oriented in cells by means of conventional orientation layers or under the action of external fields (such as magnetic or electric fields) in the LC phase and can be photo cross-linked in a second stage by conventional means (irradiation with non-polarized light) without losing the orientation impressed in the monomeric state.

Layer structures of this kind are known, see EP-A-331 233. (Throughout this specification documents are identified. The contents of all of these documents are herein incorporated by reference). They are produced by orienting a monomer layer in an external field and then irradiating part of it through a mask. Cross-linking is initiated only in the irradiated region. The direction of the external field is then changed, and the monomer regions which have not yet been cross-linked are re-oriented in the new field direction. The latter region is then cross-linked by illumination. Clearly, this method cannot result in an orientation structure with high local resolution, since, owing to the shading of the mask, the radical cross-linking reaction is not sharply defined.

Methods of generating orientation layers with locally variable orientation properties have become known recently. For example, U.S. Pat. No. 4,974,941 describes orientation by photolithography of dichroic dye molecules incorporated in the polymer.

Layer structures comprising a film of cross-linked liquid crystalline monomers in contact with an orientation layer of a photo-orientatable polymer network (PPN) are described in European Patent Publication No. 0 611 981, published Aug. 24, 1994. These layer structures are produced by orienting the liquid crystalline monomers by interaction with the PPN layer and by fixing the orientations in a subsequent cross-linking step. For other details, reference should be made to concurrently filed U.S. patent application Ser. No. 08/489,865 now abandoned in favor of 08/721,509, the contents of which are herein incorporated by reference, which corresponds to Swiss Patent Application No. 2016/94.

Owing to the high-quality copying techniques which are available, there is an increasing need and requirement to prevent forgery of security elements in banknotes, credit cards, documents, etc., which however must clearly be recognized for what they are by the general public. Most security features in use at present, for example holograms or kinegrams (J. F. Moser, "Document Protection by Optically Variable Graphics", in "Optical Document Security", R. L. van Renesse (ed.), Artech House, Boston, London, page 169) are based on diffraction of light on gratings. To check a document's authenticity, these safety features must be observed at different angles of vision. This results in three-dimensional images, iridescence, or cinematic effects which have to be examined in accordance with rules specific to the pattern. This results in the difficulty that the general public needs to know a number of these complicated rules in order visually to check that a security element of this kind is genuine. Security features based on diffraction are also very complicated to check, particularly mechanically. There is no practical possibility of manual reading-in of individual items, for example images or numbers coded by these techniques.

EP-A 435 029 describes security elements in the form of cholesteric liquid crystals, of the kind known for example in liquid crystal thermometers. Cholesteric liquid crystals, like mechanical gratings, have a periodic structure. This property, known since 1888, results in the color of reflected light varying with the angle of observation. Unfortunately, the test for genuineness based on the associated iridescence is beset with the same problems as with mechanical gratings.

The invention provides other possibilities for optical and electro-optical components and equipment, using layer structures of the above-mentioned kind.

SUMMARY OF THE INVENTION

The subject invention provides an optical component having a layered structure which includes (i) a substrate comprising a specular or diffuse reflector, (ii) an orientation layer, and (iii) an anisotropic layer of cross-linked liquid crystalline monomers in contact with the orientation layer.

According to the invention, a substrate comprises a reflector. The reflector can be a diffuse or specular metal surface or reflecting polymers, such as those containing pigments as in the case of metallized car paints, or reflecting paper, or dielectric mirrors, or the like. The reflectors must at least partly retain the state of polarization of the incident light. An arrangement of this kind according to the invention is particularly suitable for use in prevention of forgery and copying of banknotes or documents, or for generating reflective liquid crystal displays or for producing optical components for integrated optics, such as waveguides, gratings, non-linear optical (NLO) active substrates, or electro-optical Mach-Zender modulators, etc.

BRIEF DESCRIPTION OF THE FIGURE

Embodiments of the invention have been described hereinafter with reference to the accompanying simplified diagrammatic drawings in which.

DETAILED DESCRIPTION OF THE INVENTION

Figure 1:
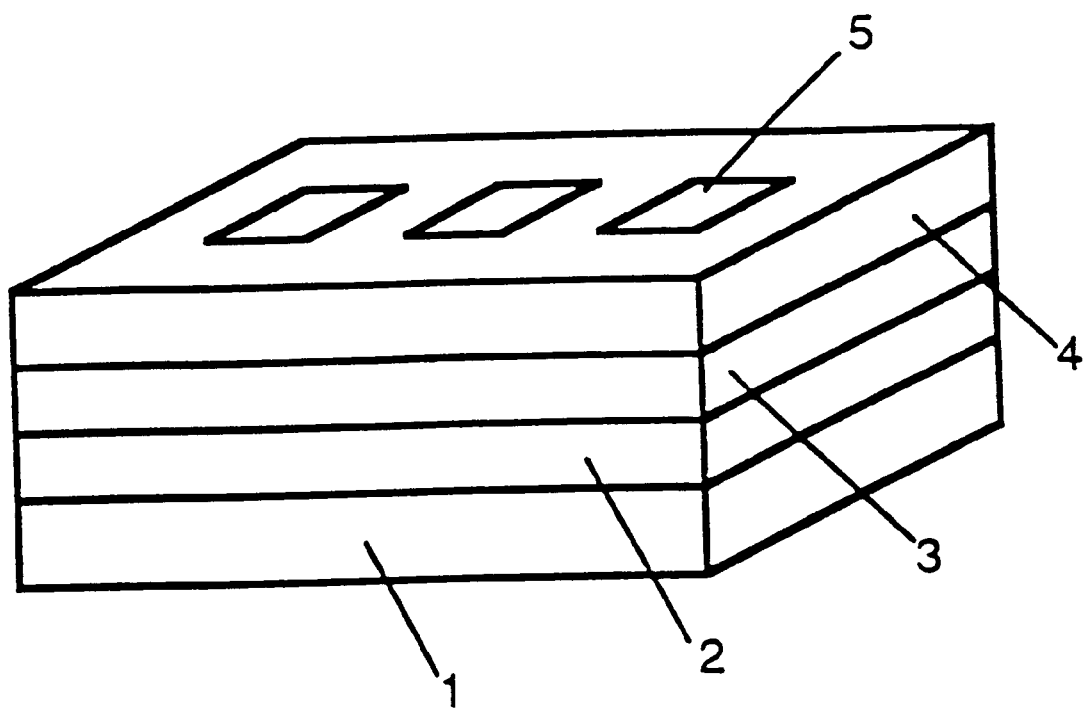
FIG. 1—Diagrammatic representation of the structure of a forgery resistant banknote.

The invention will now be described in forms of its preferred embodiments. These embodiments are set forth to aid in understanding the invention, but are not to be construed as limiting.

The subject invention provides an optical component having a layered structure which includes (i) a substrate comprising a specular or diffure reflector, (ii) an orientation layer, and (iii) an anisotropic layer of cross-linked liquid crystalline Monomers in contact with the orientation layer.

One embodiment of the invention is directed to an optical component having a layered structure having an anisotropic layer of cross-linked liquid crystalline monomers an orientation layer that is in contact with the anisotropic layer, a specular or diffuse reflector, and a substrate being optionally present in contact with one or two of the layers. The substrate being transparent. In another embodiment of the invention, the substrate is opaque.

An embodiment of the invention will now be described with reference to the accompanying drawing.

FIG. 1 provides a diagrammatic detail of a layer structure in a forgery-proof banknote. The basis or substrate of the layer structure is a paper layer 1, which can be identical with conventional banknote paper. Many conventional banknotes already comprise a metal strip or filament, the aim being to give some protection against forgery. Accordingly, a metal layer 2 covers parts of the surface of paper 1. An orientation layer 3 is disposed on the metal layer and has an orienting effect on a retarder layer 4 above it. The orientation layer 3 has a pattern which is transferred to the retarder layer 4 before cross-linking thereof and is then present as a pattern 5 in the retarder layer. When the metal strip coated with the retarder pattern is observed in non-polarized light, the normal metal filament is visible. If the configuration is examined through a polarization filter, the pattern becomes visible. The pattern can be recognized either visually or by machine, using polarization-sensitive detectors.

This is a method of incorporating very elegant means against copying or forgery of banknotes, credit cards, documents etc. The retarder pattern can, for example, contain an image or a text. It can also be used to make normally invisible codes visible when observed through a polarization filter.

Owing to the invisibility of the retarder pattern when observed with non-polarized light, the layer structure can also be disposed over other security features without influencing the properties thereof. This, in combination with other anti-copying methods, can further increase the protection against forgery.

Alternatively, a retarder layer whose optical axis is at an angle to the surface can be incorporated in the security element. The layer can then be tilted to produce colors, or light and dark effects, which are asymmetrical relative to the position before tilting.

The invention is distinguished from known security elements because the genuineness of the safety feature can easily be checked by the general public, as it is not necessary first to learn to recognize complicated iridescence or cinematic effects.

Other details of the invention will be clear from the following examples.

EXAMPLE 1

Production of a PPN Layer

The PPN material can e.g. be cinnamic acid derivatives. A PPN material having a high glass transformation point (Tg=133° C.) was chosen for the example:

Polymer:

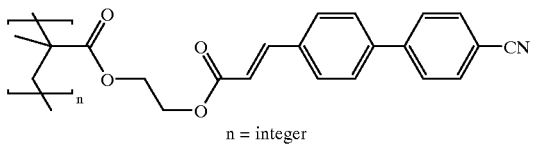

n = integer

A glass plate was spin-coated with a 5% solution of them PPN material in NMP for 1 minute at 2000 rpm. The layer was then dried at 130° C. on a heating bench for 2 hours and was dried for a further 4 hours in a vacuum at 130° C. The layer was then illuminated with linear polarized light from a 200W Hg very high-pressure lamp at room temperature for 5 minutes. The layer could then be used as an orientation layer for liquid crystals. However, the thermal stability of the orientation layer was too small for many applications. For example the orientation capacity was lost after 15 minutes, for example at 120° C.

EXAMPLE 2

A Mixture of Cross-Linkable LC Monomers for the LCP Layers

The following diacrylate components were used as cross-linkable LC monomers in the examples:

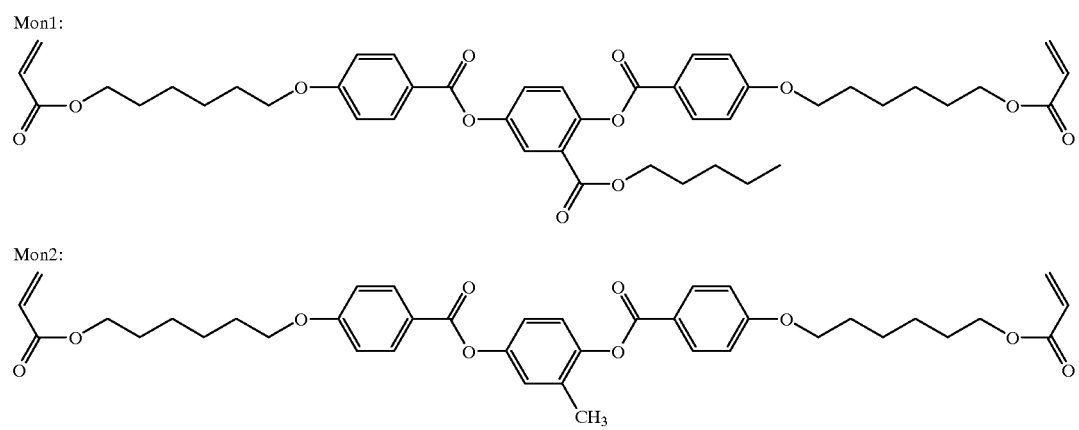

Mon3:

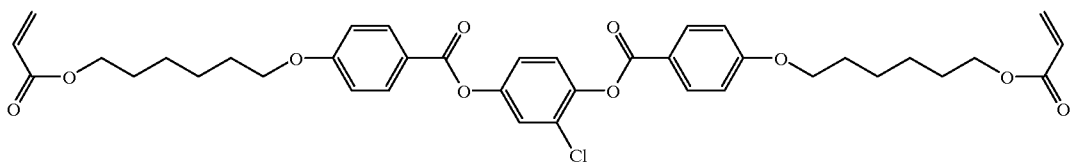

These components were used to develop a super-coolable nematic mixture $M_{LCP}$ having a particularly low melting point (Tm≈35° C.), so that the LCP layer could be prepared at room temperature.

The diacrylate monomers were present in the mixture in the following proportions:

Mon. 1: 80%
Mon. 2: 15%
Mon. 3: 5%

In order to accelerate the cross-linking process, 2% of Ciba-Geigy photo-initiator IRGACURE 369 was added. The mixture MLCP was dissolved in anisole and applied to a PPN substrate. The thickness of the LCP layer could be adjusted over a wide range, via the concentration of MLCP in anisole.

For the purpose of photo-induced cross-linking of the LC monomers, the layers after orientation were irradiated with isotropic light from a 150W xenon lamp for about 30 minutes, thus fixing the orientation.

EXAMPLE 3

A Retarder on a Specular or Diffuse Reflection Metal Surface

A PPN layer was applied to a glass plate vapor-coated with aluminum, and was then irradiated with linear polarized UV light. The direction of polarization during illumination of one half of the plate was rotated through 45° relative to the direction of polarization when illuminating the other half. A 30% solution of MLCP in anisole was applied to the illuminated PPN layer by spin coating (2 min. at 2000 rpm). These conditions resulted in a layer which, after cross-linking, had an optical retardation of about 140 nm. However, the light reflected by the metal layer underwent twice the optical retardation (280 nm). This approximately corresponded to a ½ plate, relative to an average wavelength in the visible part of the spectrum.

When the reflecting light was observed without using a polarizer, only an optically unstructured reflecting plate was visible. If however a polarizer was held in front of the plate so that the direction of transmission coincided with one of the two directions determined by the illumination, the corresponding half of the plate appeared light whereas the other half appeared deep blue.

It is therefore possible to write information on reflecting surfaces which can be read only by using a polarizer. These retardation patterns can be used, for example, for prevention of copying and for checking the genuineness of documents, banknotes, or the like.

Upon reading the present specification, various alternative embodiments will become obvious to those skilled in the art. These variations are to be considered within the scope and spirit of the invention, which is only to be limited by the claims which follow and their equivalents.

What is claimed is:

1. An optical component comprising:
a layer structure including
an anisotropic layer of cross-linked liquid crystalline monomers,
an orientation layer in contact with the anisotropic layer,
a specular or diffuse reflector which is arranged behind the anisotropic layer as seen by a viewer: and
a substrate comprising a transparent material, wherein the substrate has two opposing sides and is provided on both of these sides with the layer structure.

2. An optical component comprising:
a layer structure including
an anisotropic layer of cross-linked liquid crystalline monomers,
an orientation layer in contact with the anisotropic layer,
a specular or diffuse reflector which is arranged behind the anisotropic layer as seen by a viewer; and
a substrate comprising a transparent material, wherein the substrate has two opposing sides and one side of the substrate has the layer structure, and an opposite side of the substrate has a non-photostructured retarder layer or retarder foil.

3. An optical component comprising:
a layer structure comprising
an anisotropic layer of cross-linked liquid crystalline monomers
an orientation layer in contact with the anisotropic layer,
a specular or diffuse reflector which is arranged behind the anisotropic layer as seen by a viewer; and
a substrate comprising a transparent material, wherein the substrate is optically an isotropic.

4. An optical component comprising:
a layer structure comprising
an anisotropic layer of cross-linked liquid crystalline monomers,
an orientation layer in contact with the anisotropic layer,
a specular or diffuse reflector which is arranged behind the anisotropic layer as seen by a viewer, and
a substrate,
wherein the layer structure comprising the liquid crystalline monomer layer and the orientation layer is disposed over at least one security feature used to prevent document forgery.

5. An optical component having a layer structure, the optical component comprising:
(a) an anisotropic layer of cross-linked liquid crystal monomers,
(b) an orientation layer in contact with the anisotropic layer (a), and
(c) a specular or diffuse reflector, which is arranged behind the anisotropic layer (a) as seen by a viewer, a substrate being optionally present in contact with one or two of the layers and wherein the orientation layer and the liquid crystalline monomer layer have a pattern with a locally varying arrangement of molecules.

6. The optical component according to claim 4, wherein the substrate comprises a reflector.

7. The optical component according to claims 1, 2, 3, or 4 wherein the reflector of the layer structure is disposed on the side of the substrate opposite the orientation layer.

8. The optical component according to claims 1, 2, 3, or 4 wherein the reflector of the layer structure is disposed adjacent the liquid crystalline monomer layer, the liquid crystalline monomer layer having optical information which is observable though the substrate.

9. The optical component according to claims 1, 2, 3, or 5, wherein the substrate has a surface abutting the orientation layer and the orientation layer includes a tilting angle in the liquid crystalline monomer layer, so that an optical axis of the liquid crystalline monomer layer is at an angle to the substrate surface.

10. The optical component according to claims 1, 2, 3, 4, or 5, wherein the liquid crystalline monomer layer contains dichroic dye molecules.

11. The optical component according to claims 1, 2, 3, 4, or 5, wherein the reflector of the layer structure comprises metal in the form of a metallic filament.

* * * * *

UNITED STATES PATENT AND TRADEMARK OFFICE
CERTIFICATE OF CORRECTION

PATENT NO.     : 6,144,428
DATED          : November 7, 2000
INVENTOR(S)    : Schadt et al.

It is certified that error appears in the above-identified patent and that said Letters Patent is hereby corrected as shown below:

Column 6,
Line 39, "monomers" should read -- monomers, --.
Line 45, "an isotropic" should read -- anisotropic --.

Column 7,
Lines 8 and 11, "4 wherein" should read -- 4, wherein --.

Column 8,
Line 3, "includes" should read -- induces --.

Signed and Sealed this

Eighteenth Day of November, 2003

JAMES E. ROGAN
*Director of the United States Patent and Trademark Office*